(12) United States Patent
Jung

(10) Patent No.: US 9,030,538 B2
(45) Date of Patent: May 12, 2015

(54) THREE DIMENSIONAL LIQUID CRYSTAL DISPLAY DEVICE AND METHOD FOR DRIVING THE SAME

(75) Inventor: Ho Young Jung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 299 days.

(21) Appl. No.: 13/149,469

(22) Filed: May 31, 2011

(65) Prior Publication Data
US 2011/0298906 A1    Dec. 8, 2011

(30) Foreign Application Priority Data

Jun. 3, 2010    (KR) ........................ 10-2010-0052384

(51) Int. Cl.
     *H04N 15/00*      (2006.01)
     *H04N 13/04*      (2006.01)
     *G03B 21/00*      (2006.01)

(52) U.S. Cl.
     CPC ....... *H04N 13/0438* (2013.01); *H04N 13/0422* (2013.01); *H04N 13/0497* (2013.01)

(58) Field of Classification Search
CPC ......... H04N 9/31; H04N 5/228; H04N 13/04; H04N 15/00; G09G 5/10; G09G 3/36; G09G 5/00; G09G 3/3426; G09G 2320/0646; G09G 2360/16; G06F 3/038; G09T 15/00; G02F 1/1333; G03B 21/00
USPC ........... 348/56, E15.001, 53, 222.1; 353/122; 382/276; 345/419, 87, 581, 691, 89
See application file for complete search history.

(56) References Cited

U.S. PATENT DOCUMENTS

| | | | |
|---|---|---|---|
| 4,633,299 A * | 12/1986 | Tanaka ........................... | 348/656 |
| 6,580,464 B1* | 6/2003 | Kunitani et al. .............. | 348/656 |
| 2002/0097907 A1 | 7/2002 | Fukasawa | |
| 2002/0135553 A1* | 9/2002 | Nagai et al. ..................... | 345/89 |
| 2002/0175886 A1* | 11/2002 | Ham ............................... | 345/87 |

(Continued)

FOREIGN PATENT DOCUMENTS

| | | |
|---|---|---|
| CN | 1351448 A | 5/2002 |
| WO | WO 2009157714 A2 | 12/2009 |

OTHER PUBLICATIONS

Color Correction for Tone Mapping by R. Mantiuk, A. Tomaszewska and W. Heidrich; Eurographics 2009 vol. 28.*

(Continued)

*Primary Examiner* — Dave Czekaj
*Assistant Examiner* — Dramos I Kalapodas
(74) *Attorney, Agent, or Firm* — Brinks Gilson & Lione

(57) ABSTRACT

Disclosed is a three dimensional liquid crystal display device (3D LCD device) which facilitates to improve a picture quality of a three-dimensional image (3D image) by color and luminance corrections, and a method for driving the same, wherein the device comprises an image data analyzer which analyzes a luminance level for each of R, G, and B colors of original image data inputted to display the 3D image; an image data converter which generates color correction data for adjusting a color balance of the R, G, and B colors distorted by the shutter glass, and generates gamma correction data for compensating a luminance reduction, on the basis of luminance analyzing results provided from the image data analyzer; and a timing controller which converts the input image data into image data of a frame unit, reflects the color correction data and the gamma correction data in the image data of the frame unit, and supplies the corrected image data to a data driver.

8 Claims, 9 Drawing Sheets

(56) References Cited

U.S. PATENT DOCUMENTS

| | | | |
|---|---|---|---|
| 2003/0006952 A1* | 1/2003 | Hong | 345/89 |
| 2003/0128218 A1* | 7/2003 | Struyk | 345/581 |
| 2004/0095402 A1* | 5/2004 | Nakano | 346/102 |
| 2005/0168596 A1* | 8/2005 | Ito et al. | 348/222.1 |
| 2007/0035707 A1* | 2/2007 | Margulis | 353/122 |
| 2007/0159448 A1* | 7/2007 | Inuzuka et al. | 345/102 |
| 2007/0229423 A1* | 10/2007 | Tyrrell | 345/89 |
| 2008/0150880 A1* | 6/2008 | Inuzuka et al. | 345/102 |
| 2008/0278599 A1* | 11/2008 | Shiohara | 348/222.1 |
| 2009/0051711 A1* | 2/2009 | Evanicky et al. | 345/690 |
| 2010/0303444 A1* | 12/2010 | Sasaki et al. | 386/248 |
| 2011/0001807 A1* | 1/2011 | Myokan | 348/56 |
| 2011/0090319 A1* | 4/2011 | Kim et al. | 348/51 |
| 2011/0157260 A1* | 6/2011 | Pyun et al. | 345/691 |
| 2011/0164122 A1* | 7/2011 | Hardacker | 348/53 |

OTHER PUBLICATIONS

"Color Correction for Tone Mapping" by R. Mantiuk et al., vol. 29 No. 2, Eurographics 2009.*

Office Action issued in corresponding Chinese Patent Application No. 201110148529.4, mailed May 20, 2013, 17 pages.

* cited by examiner

<RELATED ART APPLICATION>

<PRESENT INVENTION APPLICATION>

<RELATED ART APPLICATION>

<PRESENT INVENTION APPLICATION>

THREE DIMENSIONAL LIQUID CRYSTAL DISPLAY DEVICE AND METHOD FOR DRIVING THE SAME

This application claims the benefit of Korea Patent Application No. 10-2010-0052384, filed on Jun. 3, 2010, the entire contents of which is incorporated herein by reference for all purposes as if fully set forth herein.

BACKGROUND

1. Field of the Invention

The present disclosure relates to a liquid crystal display (LCD) device, and more particularly, to a three dimensional liquid crystal display device (3D LCD device) which facilitates to improve a picture quality of a three-dimensional image (3D image) by color and luminance corrections, and a method for driving the same.

2. Discussion of the Related Art

An LCD device includes a liquid crystal panel on which plural liquid crystal cells are arranged in a matrix-type configuration; a backlight unit which supplies light to the liquid crystal panel; and a driving circuit which drives the liquid crystal panel. The LCD device displays an image by controlling a transmittance pixel-by-pixel in accordance with an input video signal.

On the liquid crystal display panel, there are the plural liquid crystal cells defined by crossing a plurality of gate lines and a plurality of data lines. Each liquid crystal cell is provided with pixel electrode and common electrode for applying an electric field. Each of the liquid crystal cells is switched through a thin film transistor (TFT).

The driving circuit includes a gate driver (G-IC) for supplying a scan signal to the gate lines; a data driver (D-IC) for supplying a data voltage based on an image signal to the data lines; a timing controller (T-con) for supplying a control signal to the gate driver and data driver, and supplying image data to the data driver; and a backlight driver for driving a light source (backlight) supplying light to the liquid crystal panel.

In the LCD device, an alignment of liquid crystal is changed depending on a voltage formed between the pixel electrode and the common electrode pixel-by-pixel. Thus, the transmittance of light emitted from the backlight can be controlled through the alignment of liquid crystal, to thereby display the image.

Recently, a user's demand for a stereoscopic image is rapidly increased so that an LCD device capable of displaying 3D (3-dimensional) image as well as 2D (2-dimensional) image is actively developed.

The LCD device displaying 3D image can realize the 3D image through a difference in viewing between both eyes of the user (binocular parallax display). There have been proposed a shutter glass method using stereoscopic glasses, a patterned retarder method using polarizing glasses, and a lenticular lens method.

FIGS. 1 and 2 illustrate a method of realizing a 3D image by a related art shutter glass method.

Referring to FIGS. 1 and 2, the method of realizing a 3D image by the related art shutter glass method uses a difference in viewing between both eyes of the user through the use of shutter glass 20. After 2D left-eye image and 2D right-eye image, which are different from each other, are viewed by the left and right eyes of the user, two of the 2D images are integrated, whereby the integrated image is perceived as the 3D image by the user.

For this, a liquid crystal panel 10 separately displays 2D images for the left-eye viewing and right-eye viewing with a difference in time. Through the use of shutter glass 20, the right-eye viewing is intercepted and the 2D image is viewed by the left eye when the 2D image for the left-eye viewing is displayed on the liquid crystal panel 10; and the left-eye viewing is intercepted and the 2D image is viewed by the right eye when the 2D image for the right-eye viewing is displayed on the liquid crystal panel 10.

Thus, after the different 2D images are respectively viewed by the left eye and the right eye with the different in time, the viewed 2D images are integrated so that the integrated image is perceived as the 3D image by the user.

In case of the related art LCD device, the 3D image is realized by switching on/off the shutter glass 200 under the circumstance that the 2D images for the left-eye viewing and right-eye viewing are alternately displayed for a preset time period (1 frame).

While the light emitted from the liquid crystal panel 10 passes through the shutter glass 20, there is the image distortion. As shown in FIG. 3, the image is distorted in two aspects, that is, color distortion and luminance reduction.

In more detail, it is possible to switch on/off left-eye lens and right-eye lens of the shutter glass 20 through the use of light crystal. When the light emitted from the liquid crystal panel 10 passes through the shutter glass 20 on the basis of the light transmittance property of the liquid crystal, the light transmittance difference occurs depending on the light wavelength.

For example, supposing that the shutter glass 20 has the relatively-low transmittance for the blue-colored light, and the relatively-high transmittance for the red-colored light and green-colored light. In this case, the original color of the image is distorted to the yellowish color. This color distortion caused by the shutter glass 20 may deteriorate the picture quality of the 3D image.

Like the liquid crystal panel 100, the shutter glass 20 includes a light crystal layer, whereby it has the low light transmittance. Thus, while the light emitted from the liquid crystal panel 10 pass through the shutter glass 20, the luminance of the image is reduced, thereby deteriorating the picture quality of the 3D image.

BRIEF SUMMARY

S 3D LCD device for displaying a 3D image through the use of shutter glass comprises: an image data analyzer which analyzes a luminance level for each of R, G, and B colors of original image data inputted to display the 3D image; an image data converter which generates color correction data for adjusting a color balance of the R, G, and B colors distorted by the shutter glass, and generates gamma correction data for compensating a luminance reduction, on the basis of luminance analyzing results provided from the image data analyzer; and a timing controller which converts the input image data into image data of a frame unit, reflects the color correction data and the gamma correction data in the image data of the frame unit, and supplies the corrected image data to a data driver.

In another aspect of the present invention, there is provided a method for driving a 3D LCD device for displaying a 3D image through the use of shutter glass comprising: analyzing a luminance level for each of R, G, and B colors of original image data inputted to display the 3D image; generating color correction data for adjusting a color balance of the R, G, and B colors distorted by the shutter glass, and gamma correction data for compensating a luminance reduction, on the basis of luminance analyzing results provided from the image data analyzer; and displaying the 3D image by the use of image data in which the color correction data and the gamma correction data is reflected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a 3D LCD device according to the present invention and a method for driving the same will be described with reference to the accompanying drawings.

Figure 1:
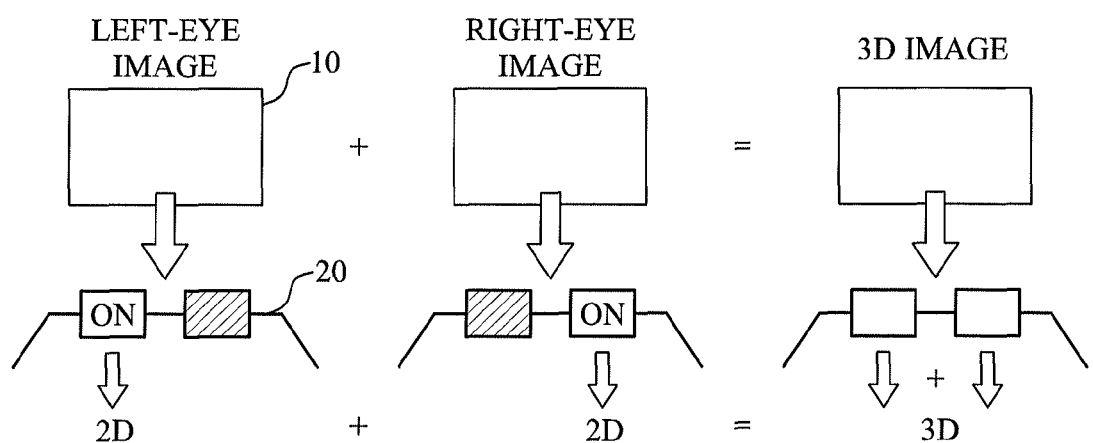
FIGS. 1 and 2 illustrate a method for displaying a 3D image in a related art shutter glass method.
Figure 2:
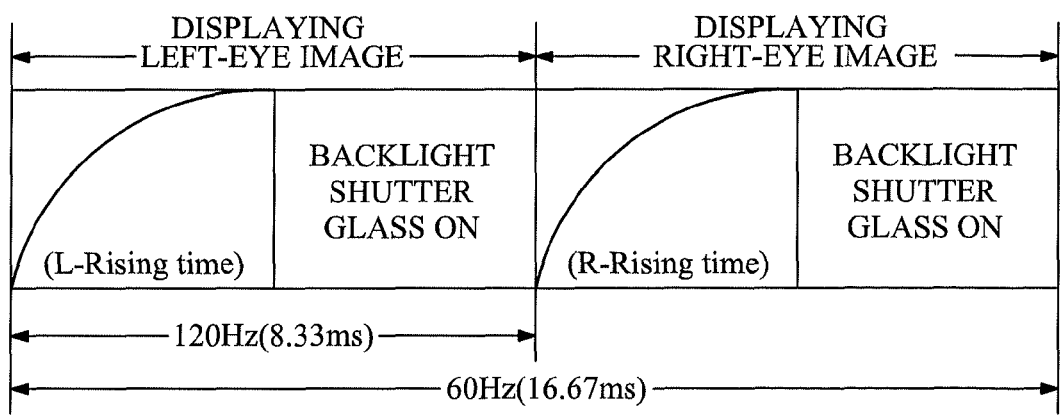
Figure 3:
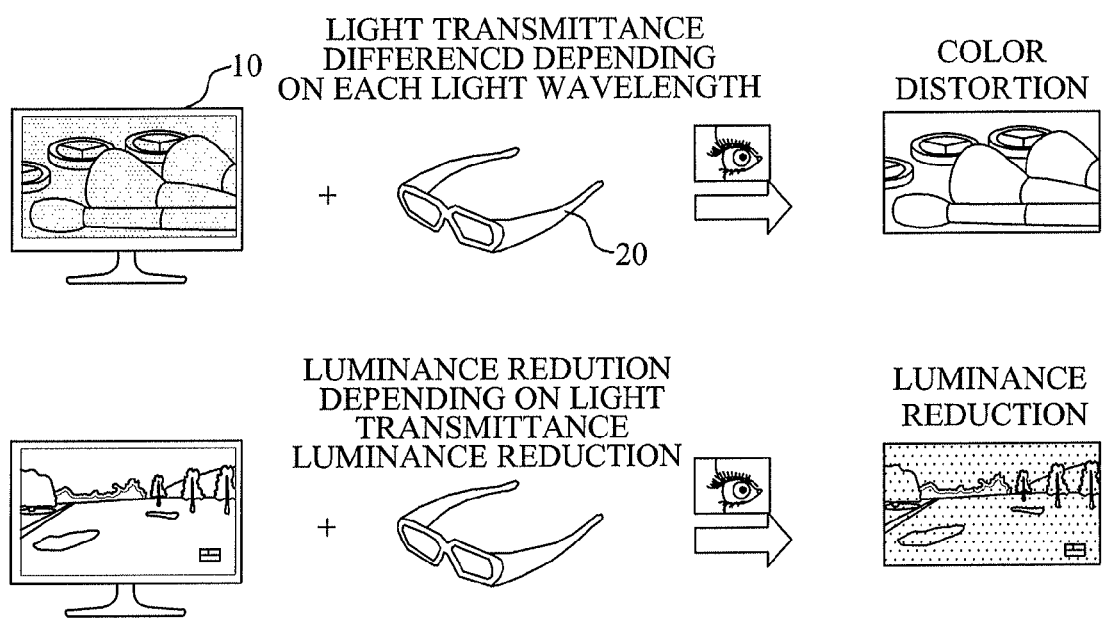
FIG. 3 illustrates color distortion and luminance reduction in a 3D LCD device using a related art shutter glass.
Figure 4:
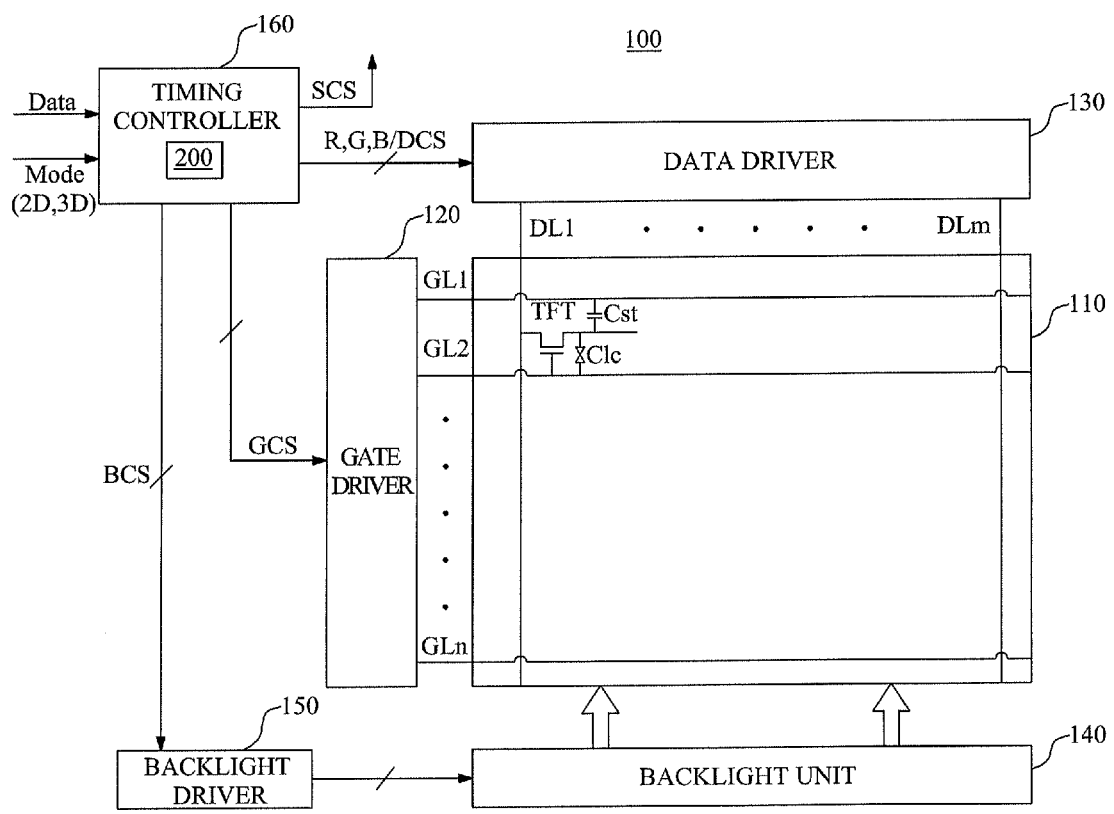
FIG. 4 illustrates a 3D LCD device according to the embodiment of the present invention.
Figure 5:
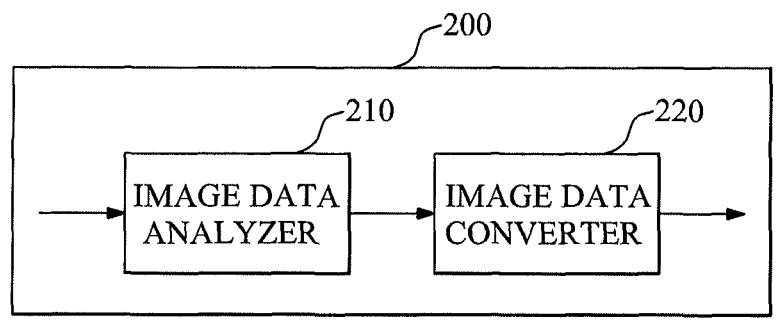
FIG. 5 illustrates an image controller of a 3D LCD device according to the embodiment of the present invention.

FIG. 4 illustrates a 3D LCD device according to the embodiment of the present invention. FIG. 5 illustrates an image controller of a 3D LCD device according to the embodiment of the present invention.

Referring to FIGS. 4 and 5, the 3D LCD device according to the embodiment of the present invention comprises a liquid crystal panel 110; a gate driver 120; a data driver 130, a backlight unit 140, a backlight driver 150, a timing controller 160, and an image controller 200.

As shown in FIG. 5, the image controller 200 comprises an image data analyzer 210, and an image data converter 220. This image controller 200 may be provided in the timing controller 160, but not necessarily. The image controller 200 may be provided separately.

The liquid crystal panel 110 includes a plurality of gate lines (G1 to Gn), a plurality of data lines (D1 to Dm), and a plurality of pixels which are formed in respective regions defined by crossing the gate and data lines to each other.

Each of the pixels includes a thin film transistor (TFT) and a storage capacitor (Cst), wherein the thin film transistor (TFT) is formed adjacent to a crossing portion of the gate and data lines.

In response to a scan signal supplied through the gate lines, the thin film transistor (TFT) supplies an analog data signal (data voltage) supplied through the data lines to the pixel.

The liquid crystal panel 110 cannot emit light in itself. Thus, light emitted from the backlight unit 140 is supplied to the liquid crystal panel 110.

The backlight unit 140 includes plural light sources for generating light; and optical members (light-guiding plate, light-diffusion plate, optical sheets, and etc.) for guiding the light emitted from the light source to the liquid crystal panel 110, and simultaneously improving light efficiency.

At this time, the light source may be cold cathode fluorescent lamp (CCFL), external electrode fluorescent lamp (EEFL), or light-emitting diode (LED).

The backlight driver 150 drives the light source according to a backlight control signal (BCS) inputted from the timing controller 160. At this time, the backlight driver 150 can control switching-on/off time of the light source, and luminance of the light source in order to realize a high resolution of image displayed on the liquid crystal panel 110 according to the backlight control signal (BCS).

The gate driver 120 generates the scan signal (gate driving signal) on the basis of a gate control signal (GCS) supplied from the timing controller 160; and then sequentially supplies the generated scan signal to the gate lines (G1 to Gn) of the liquid crystal panel 110, to thereby drive (switch) the thin film transistor (TFT).

The data driver 130 converts digital image data (R, G, B) supplied from the timing controller 160 to the analog data signal (data voltage). The converted analog data signal is supplied to the data lines in response to a data control signal (DCS) supplied from the timing controller 160.

At this time, the digital image data (R, G, B) supplied to the data driver 130 includes color correction data and gamma correction data supplied from the image controller 200 according to the embodiment of the present invention.

The timing controller 160 generates the gate control signal (GCS) for controlling the gate driver 120 through the use of vertical/horizontal synchronous signal (Vsync/Hsync) and clock signal (CLK); and the data control signal (DCS) for controlling the data driver 130. Also, the timing controller 160 generates the backlight control signal (BCS) for controlling the backlight driver 150.

The generated gate control signal (GCS) is supplied to the gate driver 120; the generated data control signal (DCS) is supplied to the data driver 130; and the backlight control signal (BCS) is supplied to the backlight driver 150.

At this time, the data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

Also, the timing controller 160 aligns externally-provided image signals, converts the aligned image signals to digital image data (R, G, B) by frame unit; and supplies the digital image data aligned by frame unit to the data driver 130.

At this time, the digital image data (R, G, B) includes the color correction data and gamma correction data supplied from the image controller 200 to be described.

The timing controller 160 divides 1 frame into a sub-frame for a left-eye image, and a sub-frame for a right-eye image; and generates digital image data based on the respective sub-frames.

If the image to be displayed on the liquid crystal panel 110 corresponds to a three-dimensional image (3D image), the timing controller 160 generates a shutter glass control signal (SCS) for controlling a shutter glass to make a user recognize the 3D image; and supplies the generated shutter glass control signal (SCS) to the shutter glass.

For this, the timing controller 160 includes a means (module) for generating and transmitting the shutter glass control signal (SCS). The shutter glass control signal (SCS) may be supplied to the shutter glass via wireless or wire means. At this time, the shutter glass control signal (SCS) may be generated or transmitted by the use of vertical/horizontal synchronous signal (Vsync/Hsync).

The shutter glass is driven depending on the shutter glass control signal (SCS), that is, left-eye lens and right-eye lens are selectively switched-on/off in accordance with the shutter glass control signal (SCS), which makes the user recognize the 3D image.

In order to prevent the image from being distorted in color and luminance by the shutter glass, the image controller 200 generates the color correction data and gamma correction data which is to be reflected on the digital image data (R, G, B) aligned in the timing controller 160. The generated color correction data and gamma correction data is supplied to the timing controller 160.

At this time, the color correction data and gamma correction data may be respectively generated for the left-eye image and the right-eye image.

It is possible to adjust a color balance of the image to be displayed on the liquid crystal panel 110, and to enhance luminance of the image by the use of color correction data and gamma correction data. For this, as shown in FIG. 5, the image controller 200 comprises an image data analyzer 210, and an image data converter 220.

The image data analyzer 210 analyzes a luminance level for each of the red, green, and blue colors of the image data provided from the timing controller 160 based on a 3D mode input. Then, the analyzed results of the luminance level of the image data are supplied to the image data converter 220.

The image data converter 220 generates the color correction data and gamma correction data based on the analyzed results of the luminance level for each of the red (R), green (G), and blue (B) colors of the image data supplied from the image data analyzer 210.

At this time, the color correction data is to adjust the color balance in the red (R), green (G), and blue (B) colors of the image provided from the liquid crystal panel 110, transmitted through the shutter glass, and viewed by the user through the shutter glass. The color correction data may be generated for each of the left-eye image and the right-eye image.

The color correction data and gamma correction data may be aligned by the unit of 1 frame by the timing controller 160, and may be included in the digital image data (R, G, B) supplied from the data driver 130.

At this time, the digital image data (R, G, B) of the 1 frame comprises the sub-frame of the left-eye image for displaying the left-eye image, and the sub-frame of the right-eye image for displaying the right-eye image.

Figure 6:
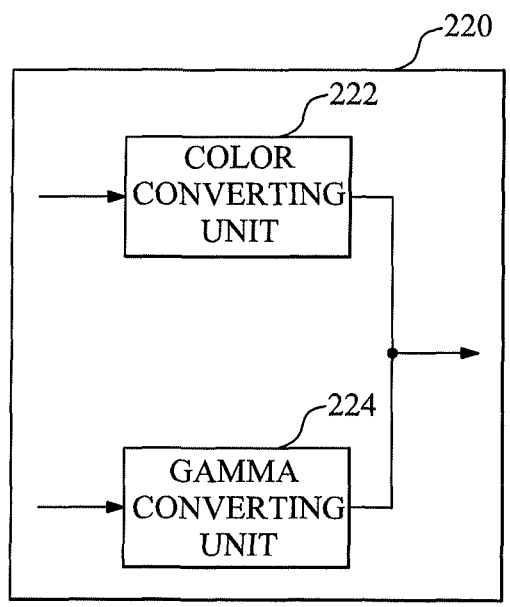
FIG. 6 illustrates an image data controller according to the embodiment of the present invention.

As shown in FIG. 6, the image data converter 220 comprises a color converting unit 222, and a gamma converting unit 224. Hereinafter, the color converting unit 222 and the gamma converting unit 224 will be explained in sequence.

The color converting unit 222 generates the color correction data for adjusting the color balance of the image, that is, color balance in the red (R), green (G), and blue (B) colors on the basis of the analyzed results of the luminance level for each of the red (R), green (G), and blue (B) colors of the image data supplied from the image data analyzer 210.

As mentioned above, when the light emitted from the liquid crystal panel 110 is transmitted through the shutter glass, there is the difference of light transmittance in accordance with the wavelength of the colored light. For example, if the shutter glass has the relatively-low transmittance for the blue (B)-colored light, and the relatively-high transmittance for the red (R)-colored light and green (G)-colored light, the original color of the image is distorted to the yellowish color.

This color distortion may be changed according to the property of the shutter glass. According to the property of material for the shutter glass lens, and the property of the liquid crystal, the original color of the image to be displayed may be distorted, and be different from the virtually-displayed color of the image.

At this time, the color balance adjustment of the red (R), green (G), and blue (B) colors may be made based on the luminance measurement results of the image (light) emitted from the liquid crystal panel 110 and the image (light) passing through the shutter glass, and the related equations.

An exemplary case, in which the original color of the image is distorted to the yellowish color by the colored-light transmittance property of the shutter glass, is shown as follows. A method for generating the color correction data and gamma correction data in the image data converter 220 will be explained.

1. The liquid crystal panel 110 is set at the maximum light transmittance, whereby the red (R), green (G), and blue (B) data is displayed as a full gray. Under such circumstances, the luminance values of the red (R), green (G), and blue (B) colors of the image displayed on the liquid crystal panel 110 are measured by the use of measuring device.

At this time, the maximum luminance value of the red (R) color is expressed as 'LvR'; the maximum luminance value of the green (G) color is expressed as 'LvG'; and the maximum luminance value of the blue (B) color is expressed as 'LvB'.

2.When the red (R), green (G), and blue (B) data is displayed as the full gray, the luminance values of the red (R), green (G), and blue (B) colors of the image displayed on the liquid crystal panel 110 and transmitted through the shutter glass are measured by the use of measuring device.

At this time, the maximum luminance value of the red (R) color measured through the shutter glass is expressed as 'LvRglass'; the maximum luminance value of the green (G) color measured through the shutter glass is expressed as 'LvGglass'; and the maximum luminance value of the blue (B) color measured through the shutter glass is expressed as 'LvBglass'.

The luminance of the red (R), green (G), and blue (B) colors of the image displayed on the liquid crystal panel 110 may be measured by the use of luminance meter or spectral luminance meter. Identically, the luminance of the red (R), green (G), and blue (B) colors of the image transmitted through the shutter glass may be measured by the use of luminance meter or spectral luminance meter.

3. The transmittance (Tr, Tg, Tb) for each of the red (R), green (G), and blue (B) colors of the shutter glass is calculated by the use of maximum luminance values (LvR, LvG, LvB) for each of the red (R), green (G), and blue (B) colors of the image displayed on the liquid crystal panel 110, and the maximum luminance values of the red (R), green (G), and blue (B) colors of the image transmitted through the shutter glass.

At this time, the transmittance (Tr, Tg, Tb) for each of the red (R), green (G), and blue (B) colors of the shutter glass may be calculated by the following equation 1.

$$Tr=LvRglass/LvR$$

$$Tg=LvGglass/LvG$$

$$Tb=LvBglass/LvB \quad \text{[Equation 1]}$$

In the above equation 1, 'LvRglass' indicates the maximum luminance of the red (R) color transmitted through the shutter glass; 'LvR' indicates the maximum luminance of the red (R) color displayed on the liquid crystal panel 110; and 'Tr' indicates the red (R)-colored light transmittance of the shutter glass.

In the same concept as the red (R)-colored light transmittance (Tr) of the shutter glass, 'Tg' indicates the green (G)-colored light transmittance of the shutter glass; and 'Tb' indicates the blue (B)-colored light transmittance of the shutter glass.

As mentioned above, the transmittance (Tr, Tg, Tb) for each of the red (R), green (G), and blue (B) colors of the shutter glass can be know from the luminance measurement results and the above equation 1. Thus, it is possible to recognize how the color the image displayed on the liquid crystal panel 110 and transmitted through the shutter glass is changed (distorted).

In order to prevent the color distortion from occurring when displaying the image by the use of original image data, the color correction data for adjusting the color balance in the red (R), green (G), and blue (B) colors is generated by the following method.

4. The luminance for each of the red (R), green (G), and blue (B) colors may be minimum 0~maximum 255 gray (0~255 gray). Thus, the input R image data (R' in), input G image data (G' in), and input B image data (B' in) may be in the range of 0~255 gray.

The luminance of the image data for each of the input R, G, and B colors may be calculated as the linear value by the following equation 2, which may be regulated as 0~1 value (Rin, Gin, Bin).

$$Rin=(R'in/255)^{2.2}$$

$$Gin=(G'in/255)^{2.2}$$

$$Bin=(B'in/255)^{2.2} \quad \text{[Equation 2]}$$

In the above equation 2, 'R'in' is the input R image data; '255' is the maximum luminance value of the image data; '2.2' is the gamma value to be reflected on the image data; 'Rin' is the regulated value of 0~1, which is obtained by linearly calculating the input R image data.

Like 'Rin' corresponding to the regulated value of the input R image data, 'Gin' is the regulated value of the input G image data; and 'Bin' is the regulated value of the input B image data.

5. The output value (Rout, Gout, Bout) for each of the R, G, and B colors within the range of 0~1 value may be calculated by adjusting the output signal (color intensity for each of the R, G, and B colors At this time, the output value (Rout, Gout, Bout) for each of the R, G, and B colors within the range of 0~1 value may be calculated by the following equation 3.

$$Rout=Rin/(Tr/min(Tr,Tg,Tb))$$

$$Gout=Gin/(Tg/min(Tr,Tg,Tb))$$

$$Bout=Bin/(Tb/min(Tr,Tg,Tb)) \quad \text{[Equation 3]}$$

In the above equation 3, 'min(Tr,Tg,Tb)' is the minimum value among the transmittance values for the R, G, and B colors of the shutter glass; 'Rout' is the red-color output value; 'Gout' is the green-color output value; and 'Bout' is the blue-color output value.

For example, the red-color output value 'Rout' may be calculated by steps of obtaining a first result by dividing the red-color transmittance (Tr) of the shutter glass by the minimum value (min(Tr,Tg,Tb)) among the transmittances for the R, G, and B colors of the shutter glass; and dividing 'Rin' corresponding to the regulated value of the R image data calculated by the above equation 2 by the obtained first result.

Like the red-color output value 'Rout', the green-color output value 'Gout' and the blue-color output value 'Bout' may be calculated by the above equation 3.

6. The color correction data (R'out, G'out, B'out) for each of the R, G, and B colors within the range of 0~255 gray may be finally outputted by reflecting the gamma value in the red-color output value 'Rout', the green-color output value 'Gout', and the blue-color output value 'Bout'.

The color correction data (R'out, G'out, B'out) for each of the R, G, and B colors may be generated by the following equation 4.

$$R'out=Rout^{2.2(gamma)}*255(gray)$$

$$G'out=Gout^{2.2(gamma)}*255(gray)$$

$$B'out=Bout^{2.2(gamma)}*255(gray) \quad \text{[Equation 4]}$$

In the above equation 4, '2.2' is the gamma value; '255' is the maximum luminance gray; 'R'out' is the red-color correction data of the image data; 'G'out' is the green-color correction data of the image data; and 'B'out' is the blue-color correction data of the image data.

The color converting unit 222 according to the embodiment of the present invention may generate the color correction data for adjusting the color balance in the R, G, and B colors of the image transmitting through the shutter glass by the use of algorithm of the above equations 1 to 4.

A method for generating the color correction data by the use of algorithm of the above equations 1 to 4 shows one example among the various examples for correcting the color distortion of the R, G, and B colors by the difference of the light transmittances for the respective wavelengths of the shutter glass.

For example, supposing that the shutter glass has the relatively-low transmittance for the blue (B)-colored light, and the relatively-high transmittances for the red (R)-colored light and green (G)-colored light. In this case, the original color of the image is distorted to the yellowish color.

Figure 7:
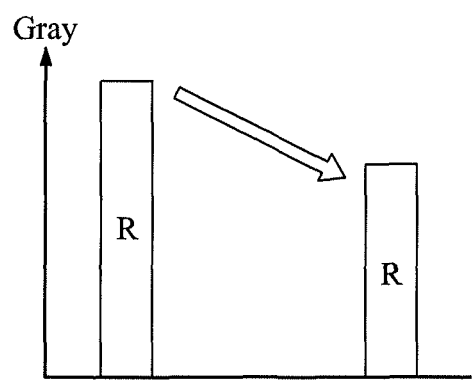
FIGS. 7 to 9 illustrate a method for displaying a 3D image according to the embodiment of the present invention.
Figure 7:
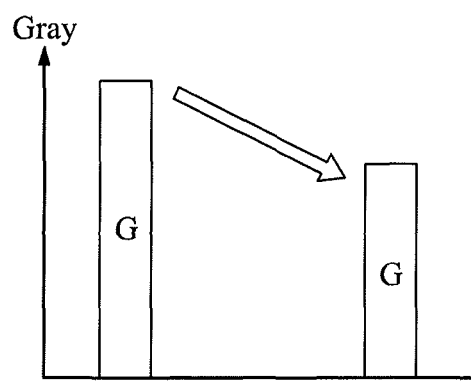
Figure 7:
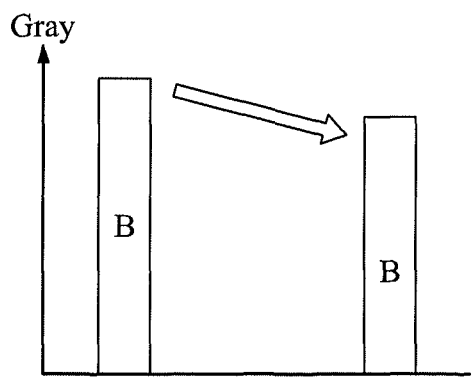

In this case, as shown in FIG. 7, the color correction data is generated to relatively lower the luminance level of each of the red (R) and green (G) colors, and to relatively raise the luminance level of the blue (B) color, whereby the luminance level of the blue (B) color is relatively higher than the luminance level of each of the red (R) and green (G) colors.

Figure 8:
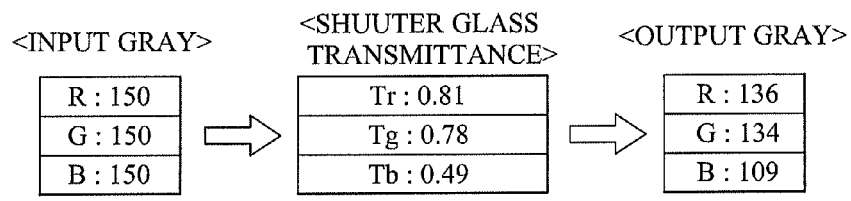
Figure 8:
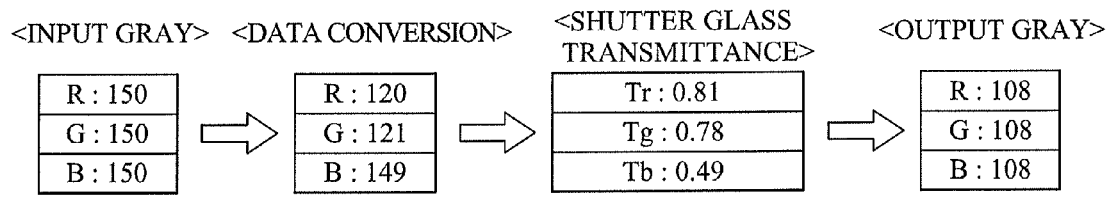

Referring to FIG. 8, according to the above luminance measurement results and the above equation 1, on the assumption that the red (R)-colored light transmittance (Tr) of the shutter glass is '0.81'; the Green(G)-colored light transmittance (Tg) of the shutter glass is '0.78'; the and blue (B)-colored light transmittance (Tb) of the shutter glass is '0.49', the color distortion occurs when the R, G, and B colored lights with the same luminance level pass through the shutter glass.

For example, if the R, G, and B colored lights with 150 gray are emitted from the liquid crystal panel 110, the virtual luminance of the image viewed by the user via the shutter glass is provided in such a manner that the R-colored light is 136 gray, the G-colored light is 134 gray, and the B-colored light is 109 gray, whereby the color balance of the R, G, and B colored lights is different from the original image data.

In this case, in order to adjust the color balance of the R, G, and B colored lights, the image data converting unit 220 generates the color correction data for each of the R, G, and B colored lights by the use of algorithm based on the above equations 2 to 4. In this case, the R image data is converted into 120 gray; the G image data is converted into 121 gray; and the B image data is converted into 149 gray.

When the image is displayed on the liquid crystal panel 110 through the respective R, G, and B color correction data, the R, G, and B colored lights of the image transmitting through the shutter glass are displayed as the same 108 gray, to thereby adjust the color balance of the R, G, and B colored lights.

The color balance of the R, G, and B colored lights distorted while passing through the shutter glass is adjusted by the use of color correction data, thereby improving the picture quality of the 3D image.

Hereinafter, the gamma converting unit 224 will be explained as follows.

The lens of the shutter glass may be switched-on/off by the liquid crystal. As the light emitted from the liquid crystal panel 110 passes through the liquid crystal layer of the shutter glass, the luminance of the light is reduced.

The gamma converting unit 224 generates the gamma correction data for changing the gamma value set as a basic value when the 3D image is displayed on the liquid crystal panel 110 in accordance with the 3D mode input.

Figure 9:
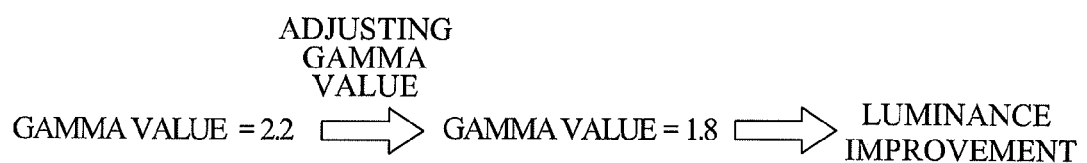
Figure 10:
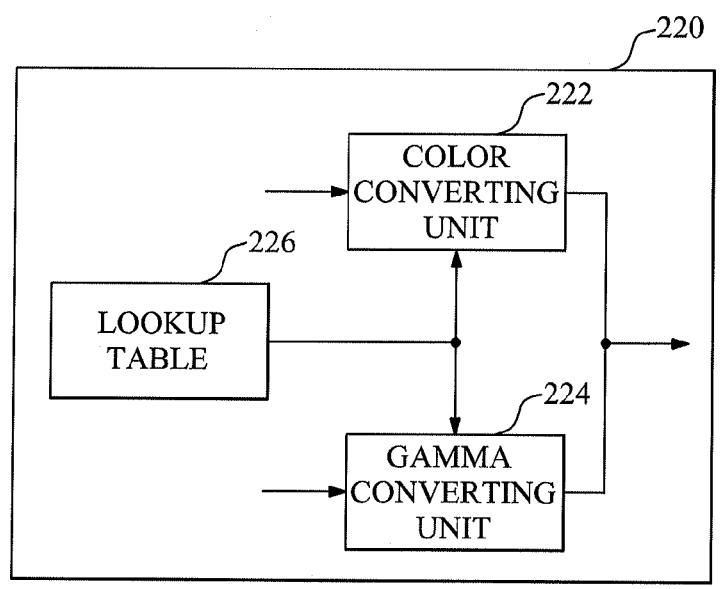
FIG. 10 illustrates an image data converter according to another embodiment of the present invention.

For example, as shown in FIG. 9, if the basic gamma value is set as '2.2', the gamma correction data for changing the gamma value from '2.2' to '1.8' is generated to improve the luminance of the 3D image. In this case, the gamma correction data is set to improve the luminance of the intermediate gray scale among the entire gray scales of the R, G, and B image data.

The gamma correction data may be generated for the R, G, and B image data. The gamma value changed depending on the gamma correction data is supplied to the data driver 130 via the timing controller 160, and is then reflected in the data voltage to be applied to each pixel of the liquid crystal panel 110.

Accordingly, the picture quality of the 3D image can be improved by raising the respective R, G, and B color luminance reduced while passing through the shutter glass.

In comparison to the original image data, the respective R, G, and B color luminance may be lowered due to the adjustment of the color balance of the R, G, and B colors through the use of color correction data. In this case, the gamma correction data enables to raise the lowered luminance of the respective R, G, and B colors to the luminance level of the original image data, thereby improving the picture quality of the 3D image.

According to another embodiment of the present invention, the image data converting unit 220 may comprise a lookup table 226 in addition to the above color converting unit 222 and the gamma converting unit 224.

The lookup table (LUT) 226 may be realized as a nonvolatile memory such as EEPROM (Electrically Erasable Programmable Read-Only Memory). The color converting unit 222 and the gamma converting unit 224 may generate the color correction data and the gamma correction data by the use of lookup data previously set in the lookup table 226.

For this, the lookup table 226 may store the lookup data for generating the color correction data in accordance with the above equations 2 to 4, and also store the lookup data for generating the gamma correction data in accordance with the input image data.

Figure 11:
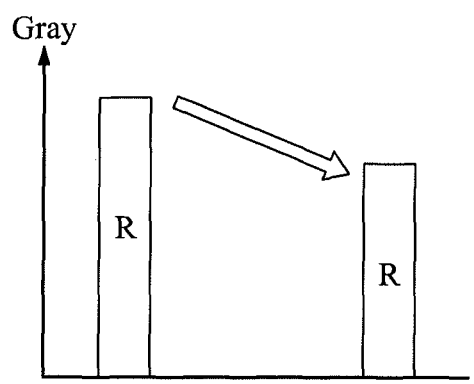
FIGS. 11 and 12 illustrate a method for displaying a 3D image according to another embodiment of the present invention.
Figure 11:
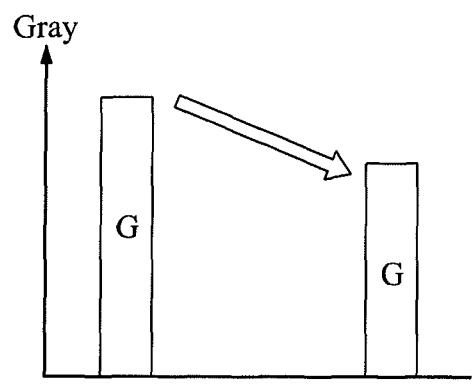
Figure 11:
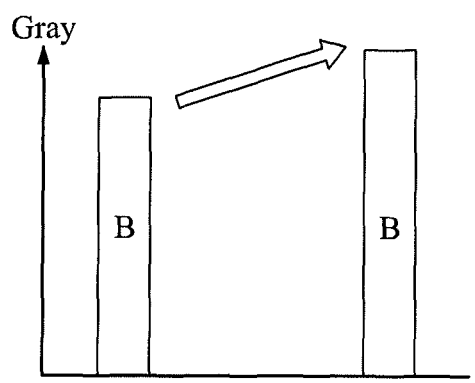
Figure 12:
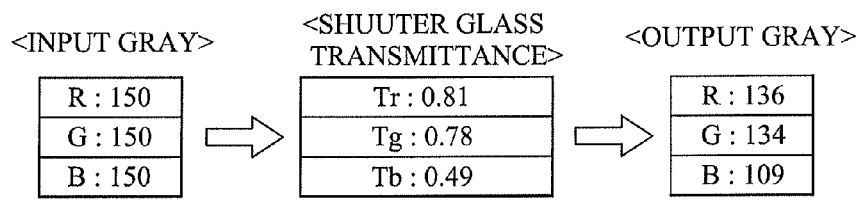
Figure 12:
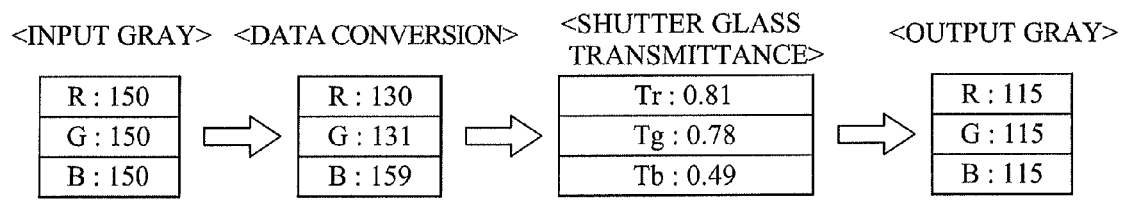

FIGS. 11 and 12 illustrate a method for displaying a 3D image according to another embodiment of the present invention.

Referring to FIGS. 11 and 12, when the original color of the image is distorted to the yellowish color due to the property of the shutter glass, as shown in FIG. 11, the color correction data is generated to lower the luminance level of the red (R) and green (G) colors. Also, the color correction data may be generated to raise the luminance level of the blue (B) color.

Referring to FIG. 12, according to the above luminance measurement results and the above equation 1, on the assumption that the red (R)-colored light transmittance (Tr) of the shutter glass is '0.81'; the green (G)-colored light transmittance (Tg) of the shutter glass is '0.78'; the and blue (B)-colored light transmittance (Tb) of the shutter glass is '0.49', the color distortion occurs when the R, G, and B colored lights with the same luminance level pass through the shutter glass.

For example, if the R, G, and B colored lights with 150 gray are emitted from the liquid crystal panel 110, the virtual luminance of the image viewed by the user via the shutter glass is provided in such a manner that the R-colored light is 136 gray, the G-colored light is 134 gray, and the B-colored light is 109 gray, whereby the color balance of the R, G, and B colored lights is different from the original image data.

In this case, in order to adjust the color balance of the R, G, and B colored lights, the color converting unit 222 of the image data converting unit 220 generates the color correction data for each of the R, G, and B colored lights by the use of algorithm based on the above equations 2 to 4. In this case, the R image data is converted into 130 gray; the G image data is converted into 131 gray; and the B image data is converted into 159 gray.

When the image is displayed on the liquid crystal panel 110 through the respective R, G, and B color correction data, the R, G, and B colored lights of the image transmitting through the shutter glass are displayed as the same 115 gray, to thereby adjust the color balance of the R, G, and B colored lights.

The color balance of the R, G, and B colored lights distorted while passing through the shutter glass is adjusted by the use of color correction data, thereby improving the picture quality of the 3D image.

The respective R, G, and B luminance relatively lowered in comparison to those of the original image data when the color balance of the R, G, and B colors is adjusted by the above color correction data may be raised to the original level by adjusting the gamma values.

For the above explanation of the present invention, the image controller 200 is provided inside the timing controller 160, but not necessarily. According to another embodiment of the present invention, the image controller 200 may be separately provided from the timing controller 160 inside the LCD device 100.

If the image controller 200 is independently formed outside the timing controller 160, the generated color correction data and gamma correction data may be supplied to the data driver 130 while being reflected in the digital image data aligned by frame unit.

Accordingly, the present invention enables to improve the picture quality of the 3D image displayed on the 3D LCD device.

According to the embodiment of the present invention, the picture quality of the 3D image can be improved by adjusting the color balance of the R, G, and B colors of the image through the use of color correction of the image data.

According to the embodiment of the present invention, the picture quality of the 3D image can be improved by raising the luminance level of the image through the use of gamma value correction.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A 3D LCD device for displaying a 3D image through the use of shutter glass comprising:
   an image data analyzer, which analyzes a luminance level for each of R, G, and B colors of original image data inputted to display the 3D image;
   an image data converter a color converting unit, which generates color correction data for adjusting a color balance of the R, G, and B colors distorted by the shutter glass, on the basis of luminance analyzing results provided from the image data analyzer;
   a gamma converting unit, which generates gamma correction data for compensating a R, G, and B luminance reduction by the shutter glass, on the basis of luminance analyzing results provided from the image data analyzer; and
   a timing controller, which converts the input image data into image data of a frame unit, reflects the color correction data and the gamma correction data in the image data of the frame unit, and supplies the corrected image data to a data driver,
   wherein the gamma converting unit increases R, G, and B luminance to a level of the original image data by using the gamma correction data,
   wherein the color correction data is generated to relatively lower the luminance level of the red and green colors, and generated to relatively raise the luminance level of the blue color based on different values of R, G, and B colored light transmittance of the shutter glass such that a color balance of R, G, and B colored lights of the 3D image transmitting through the shutter glass in gray scale is maintained with respect to a color balance of R, G, and B colored lights of the original image data in gray scale.

2. The 3D LCD device according to claim 1, wherein the color converting unit changes R, G, and B luminance values of the image data so as to compensate for a color distortion by the difference of R, G, and B colored light transmittance of the shutter glass, on the basis of R, G, and B colored light transmittance of the shutter glass.

3. The 3D LCD device according to claim 1, wherein the color converting unit changes R, G, and B luminance values of the image data so as to make the color balance of R, G, and B colored lights passing through the shutter glass be the same as the color balance of R, G, and B colored lights of the original image data for respective left-eye image and right-eye image constituting image data of one frame.

4. The 3D LCD device according to claim 1, wherein the gamma converting unit generates the gamma correction data to set a gamma value which is lower than a preset gamma value so as to compensate for the luminance reduction caused by the shutter glass.

5. The 3D LCD device according to claim 1, wherein the gamma converting unit generates the gamma correction data which enables to raise the luminance of the intermediate gray scale among the entire gray scales of the R, G, and B image data.

6. A method for driving a 3D LCD device for displaying a 3D image through the use of shutter glass comprising:
   analyzing a luminance level for each of R, G, and B colors of original image data inputted to display the 3D image;
   generating color correction data for adjusting a color balance of the R, G, and B colors distorted by the shutter glass, on the basis of luminance analyzing results provided from a image data analyzer;
   gamma correction data for compensating a luminance reduction by the shutter glass, on the basis of luminance analyzing results provided from the image data analyzer; and
   displaying the 3D image by the use of image data in which the color correction data and the gamma correction data is reflected,
   wherein R, G, and B luminance are increased to a level of the original image data by using the gamma correction data,
   wherein the color correction data is generated to relatively lower the luminance level of the red and green colors, and generated to relatively raise the luminance level of the blue color based on different values of R, G, and B colored light transmittance of the shutter glass such that a color balance of R, G, and B colored lights of the 3D image transmitting through the shutter glass in gray scale is maintained with respect to a color balance of R, G, and B colored lights of the original image data in gray scale.

7. The method according to claim 6, wherein R, G, and B luminance values of the image data are changed so as to compensate for a color distortion by the difference of R, G, and B colored light transmittance of the shutter glass, on the basis of R, G, and B colored light transmittance of the shutter glass.

8. The method according to claim 6, wherein the gamma correction data is generated to set a gamma value which is lower than a preset gamma value so as to compensate for the luminance reduction caused by the shutter glass, and
   wherein the gamma correction data is generated to raise the luminance of the intermediate gray scale among the entire gray scales of the R, G, and B image data.

* * * * *